(12) United States Patent
Birlew, Sr.

(10) Patent No.: US 11,559,060 B1
(45) Date of Patent: Jan. 24, 2023

(54) FOOD SMOKER

(71) Applicant: Donald Birlew, Sr., Dos Palos, CA (US)

(72) Inventor: Donald Birlew, Sr., Dos Palos, CA (US)

(*) Notice: Subject to any disclaimer, the term of this patent is extended or adjusted under 35 U.S.C. 154(b) by 364 days.

(21) Appl. No.: 16/900,214

(22) Filed: Jun. 12, 2020

Related U.S. Application Data

(60) Provisional application No. 62/860,316, filed on Jun. 12, 2019.

(51) Int. Cl.
*A23B 4/044* (2006.01)
*A47J 37/07* (2006.01)

(52) U.S. Cl.
CPC .......... *A23B 4/044* (2013.01); *A47J 37/0745* (2013.01); *A47J 37/0786* (2013.01)

(58) Field of Classification Search
CPC ....... A23B 4/044; A23B 4/052; A23B 4/0523; A47J 37/07; A47J 37/0704; A47J 37/0713; A47J 37/0718; A47J 37/0727; A47J 37/0731; A47J 37/0745; A47J 37/0754; A47J 37/0763; A47J 37/0781; A47J 37/0786
See application file for complete search history.

(56) References Cited

U.S. PATENT DOCUMENTS

| | | | |
|---|---|---|---|
| 3,481,267 A | 12/1969 | Saiki | |
| 4,495,860 A | 1/1985 | Hitch et al. | |
| 4,512,249 A * | 4/1985 | Mentzel | A47J 37/0704 99/482 |
| 4,643,162 A | 2/1987 | Collins | |
| 4,724,753 A | 2/1988 | Neyman et al. | |
| 4,962,696 A * | 10/1990 | Gillis | A47J 37/0704 99/417 |
| 4,962,697 A * | 10/1990 | Farrar | A47J 37/0731 99/449 |
| 5,195,423 A | 3/1993 | Beller | |
| 5,768,977 A * | 6/1998 | Parris | A47J 37/0704 99/417 |
| 5,768,983 A | 6/1998 | Treiber | |
| 6,016,797 A * | 1/2000 | Nowicke, Jr. | A47J 37/0786 126/25 R |
| 6,543,435 B1 * | 4/2003 | Regen | A47J 37/0704 126/38 |
| 7,340,993 B2 | 3/2008 | Sculuca | |
| 8,739,380 B1 * | 6/2014 | Montgomery | A47J 37/0704 29/415 |
| 8,893,704 B2 * | 11/2014 | Foster | A47J 37/0786 126/30 |
| 8,931,472 B2 | 1/2015 | Messmer | |
| D813,589 S | 3/2018 | Graves et al. | |
| 2005/0121018 A1 * | 6/2005 | Rosen | F24B 1/182 126/25 R |
| 2009/0199839 A1 * | 8/2009 | Hulsey | A47J 37/07 126/25 A |

(Continued)

*Primary Examiner* — Hung D Nguyen

(74) *Attorney, Agent, or Firm* — Cramer Patent & Design, PLLC; Aaron R. Cramer

(57) ABSTRACT

A food smoker includes a smoker body having a lid and a removable smoke and heat source secured within a base. Located adjacent the upper portion of the smoker body is a plurality of apertures configured to support at least one hanger rod. The hanger rods are capable of suspending foodstuff within the smoker body.

20 Claims, 5 Drawing Sheets

(56) References Cited

U.S. PATENT DOCUMENTS

| | | | | |
|---|---|---|---|---|
| 2010/0269713 A1* | 10/2010 | Foster | ............... | A47J 37/0781 |
| | | | | 99/482 |
| 2015/0079251 A1* | 3/2015 | Parrish | ............... | A47J 37/049 |
| | | | | 426/314 |
| 2017/0224157 A1* | 8/2017 | Rummel | ............. | A47J 37/0786 |
| 2018/0008093 A1* | 1/2018 | Parker | ............... | A47J 37/0786 |

* cited by examiner

FOOD SMOKER

RELATED APPLICATIONS

The present invention was first described in and claims the benefit of U.S. Provisional Patent Application No. 62/860,316 filed on Jun. 12, 2019, the entire disclosures of which are incorporated herein by reference.

FIELD OF THE INVENTION

The present invention relates generally to a smoker for comestibles.

BACKGROUND OF THE INVENTION

Spending time in the great outdoors is among the most popular fair weather leisure time activities. Quite often, cooking and eating a meal is made part of the outdoor activity. Whether it is a family gathering, at a picnic or just having a cookout, a great deal of time is spent around a grill.

A common way to enjoy cooking outdoors is by smoking the food, which is a great way to enjoy the cooking of food outdoors, as smoking requires a long amount of time to cook and the almost constant presence of burning fuel to induce smoke from a source such as wood. This process imparts a special smoked taste to foods. Food smokers are a low-tech way to create a great taste to the food but do take a lot of time.

A common way to smoke the food is to have grill grates that are horizontally suspended in the smoking section where the food rest upon. This requires specialized interior features and specific grates that can be properly suspended. This also creates an extra feature to clean, as well as it may introduce unwanted food spillage in the instances where the food and gates must be removed to reintroduce fuel or a smoking source, There is then a seen benefit to have such a way to suspend the food in the smoking section without having to be removed when adding fuel and a smoking source, and as a way to easily remove the food. The development of the food smoker described fulfills this need.

SUMMARY OF THE INVENTION

To achieve the above and other objectives, the present invention provides for a food smoker which comprises a domed lid which has a bottom first side that is attached via a hinge to a top first side of a smoker section and a domed firebox which frames the smoker section. The smoker section is generally hollow with an open top side, an open bottom side, and an interior. The food smoker also comprises a base attached to the bottom of the domed firebox. The base supports a plurality of fuel and a plurality of food held within the food smoker. The food smoker also comprises two pairs of apertures each of which permit the passage of a hanger and at least one grate which is supported within the smoker section and thereby supports the food placed within the food smoker. A first side of each of the hangers is shaped as a hook to restrict full passage of the hanger all the way through the aligned apertures and the aligned apertures support a rotisserie rod.

The domed lid is convex while the hinge is a torsion spring to bias the domed lid closed over the open top end of the smoker section. The domed lid may include a lid handle which is located at the apex of the domed lid. The outer circumference of the smoker section may include a plurality of ribs to provide a handle point. The outer circumference of the smoker section may include the ribs to enhance or limit heat transfer. The food smoker may also comprise a pair of side handles which are located on diametrically opposing sides of the smoker section located subjacent to the open top. The domed firebox may be concave and may hold a fuel selected from the group consisting of wood, charcoal, or food-safe fuel for cooking.

The firebox may include at least one bottom vent in environmental communication with the interior of the domed firebox to permit adding fuel during a smoking event. Spacing between the outer surface of the bottom of the firebox and the upper surface of the base may be such that a minimal amount of heat is transferred from the burning fuel to the base. The domed firebox may include an inner ridge that a bottom perimeter rim of the smoker section may rest on to removably engage. The firebox may also include a lid vent which may be in environmental communication with the interior of the domed lid at a position away from the lid handle so as to not vent heat or steam directly over the lid handle. The bottom of the firebox may include an integral neck that flares outward to transition into the base to provide balanced support to the food smoker, the fuel, and the food.

The base may be planar at the bottom of the firebox. The firebox, the neck, and the base may be an integral unit. The base may have a larger diameter than the smoker section to ensure that any dripping food or embers do not contact the support surface that the smoker is on. The smoker section, the domed lid, the domed firebox, the neck, and the base are made of metal. Each of the hangers may be a cylindrical rod having an outer diameter sized to pass through the aligned apertures. Each of the hangers may also support a food support which enables hanging support of the food from each of the hangers so that the food is suspended within the interior of the domed firebox. The food smoker may also comprise a rotisserie motor which may be secured outside of the smoker section.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
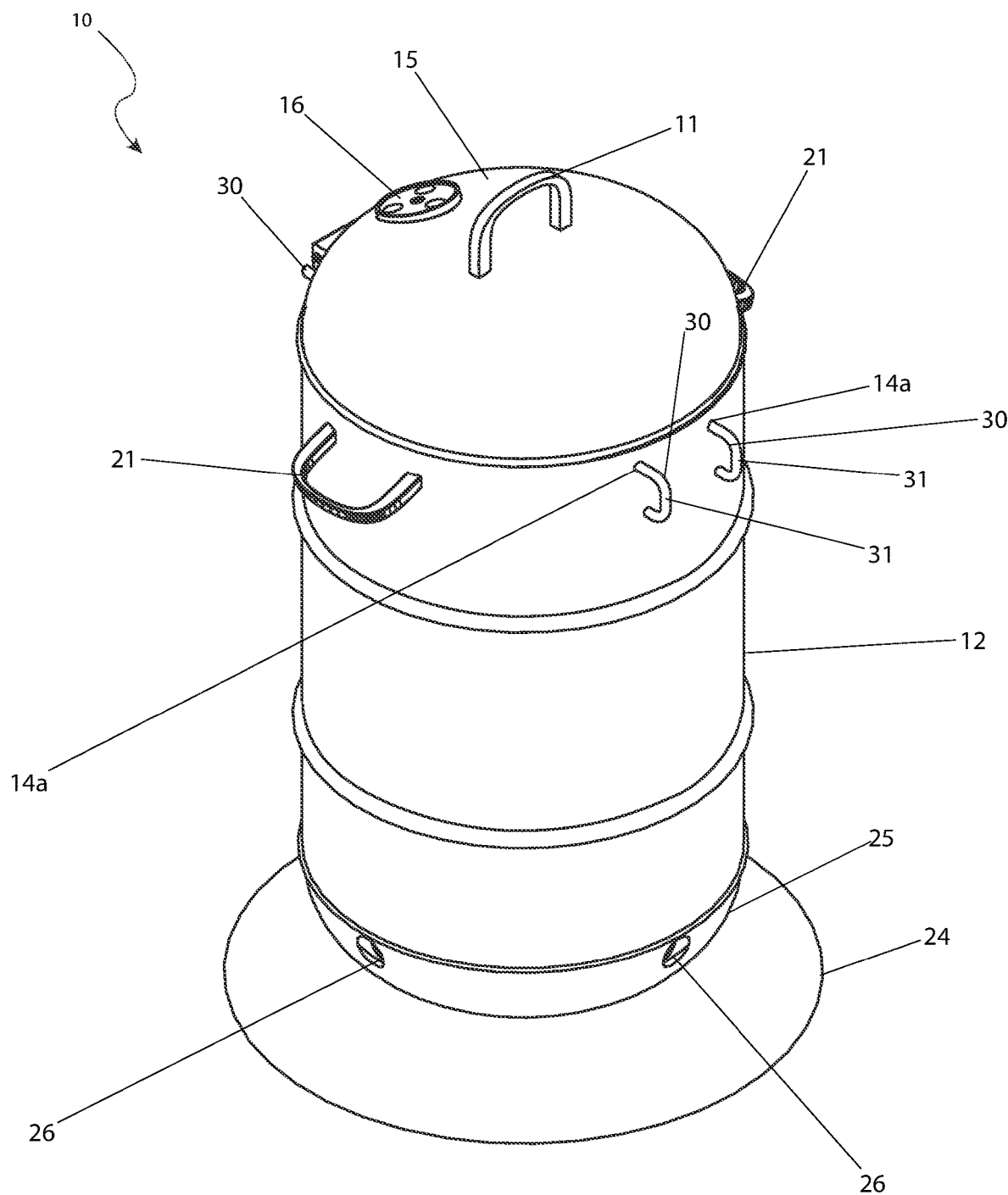
FIG. 1 is a top perspective view of the smoker 10 with a lid 15 in a closed position, according to the preferred embodiment of the present invention.

| DESCRIPTIVE KEY | |
|---|---|
| 5 | food |
| 10 | smoker |
| 11 | lid handle |

-continued

| | DESCRIPTIVE KEY |
|---|---|
| 12 | smoker section |
| 14a | first side aperture |
| 14b | second side aperture |
| 15 | lid |
| 16 | lid vent |
| 17 | hinge |
| 20 | interior |
| 21 | side handle |
| 23 | neck |
| 24 | base |
| 25 | firebox |
| 26 | bottom vent |
| 30 | hanger |
| 31 | hook |
| 40 | grate |
| 50 | food support |
| 55 | rotisserie rod |
| 56 | skewer fork |
| 57 | rotisserie motor |
| 58 | motor mount aperture |
| 60 | fastener |

1. Description of the Invention

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

The present invention is a smoker 10 capable of providing a way to support food 5 during the smoking event. FIGS. 1 through 5 illustrate the features of the smoker 10, showing a perspective view with the lid 15 in an open and closed position, as well as a top plan view and a side elevation view thereof. The smoker 10 has an overall cylindrical shape, with a domed lid 15 and a domed firebox 25 framing a smoker section 12. Attached to the bottom of the firebox 25 is a base 24 that the entire smoker 10, fuel, and food 5 held within can be supported thereby. The bottom of the firebox 25 has an integral neck 23 that flares outward to transition into the base 24, which is preferably planar at the bottom surface to provide balanced support to the entire smoker 10, fuel, and food 5. In some embodiments, the firebox 25, neck 23, and base 24 are an integral unit. In a preferred embodiment, the smoker section 12, lid 15, firebox 25, neck 23, and base 24 are a metallic construction capable of withstanding elevated temperatures commonly associated with food smoking.

The smoker section 12 is generally hollow with an open top side and an open bottom side and an interior 20. The outer circumference of the smoker section 12 may have ribs or other features to provide a handle point therefor, or to enhance or limit heat transfer. In other certain embodiments, there are a pair of side handles 21 located on diametrically opposing sides of the smoker section 12 located subjacent to the open top. At least one (1) pair of apertures (i.e., a first side aperture 14a and a second side aperture 14b) is vertically aligned on opposing sides of the smoker section 12 and positioned subjacent from the perimeter rim at the top side. The preferred embodiment has two (2) pairs of vertically aligned apertures 14a, 14b, each equidistantly spaced from a bisecting horizontal axial centerline through the smoker section 12. In embodiments where the smoker 10 has side handles 21, the pairs of vertically aligned apertures 14a, 14b are located ninety degrees (90°) away from the side handles 21, and also vertically aligned therewith.

Figure 2:
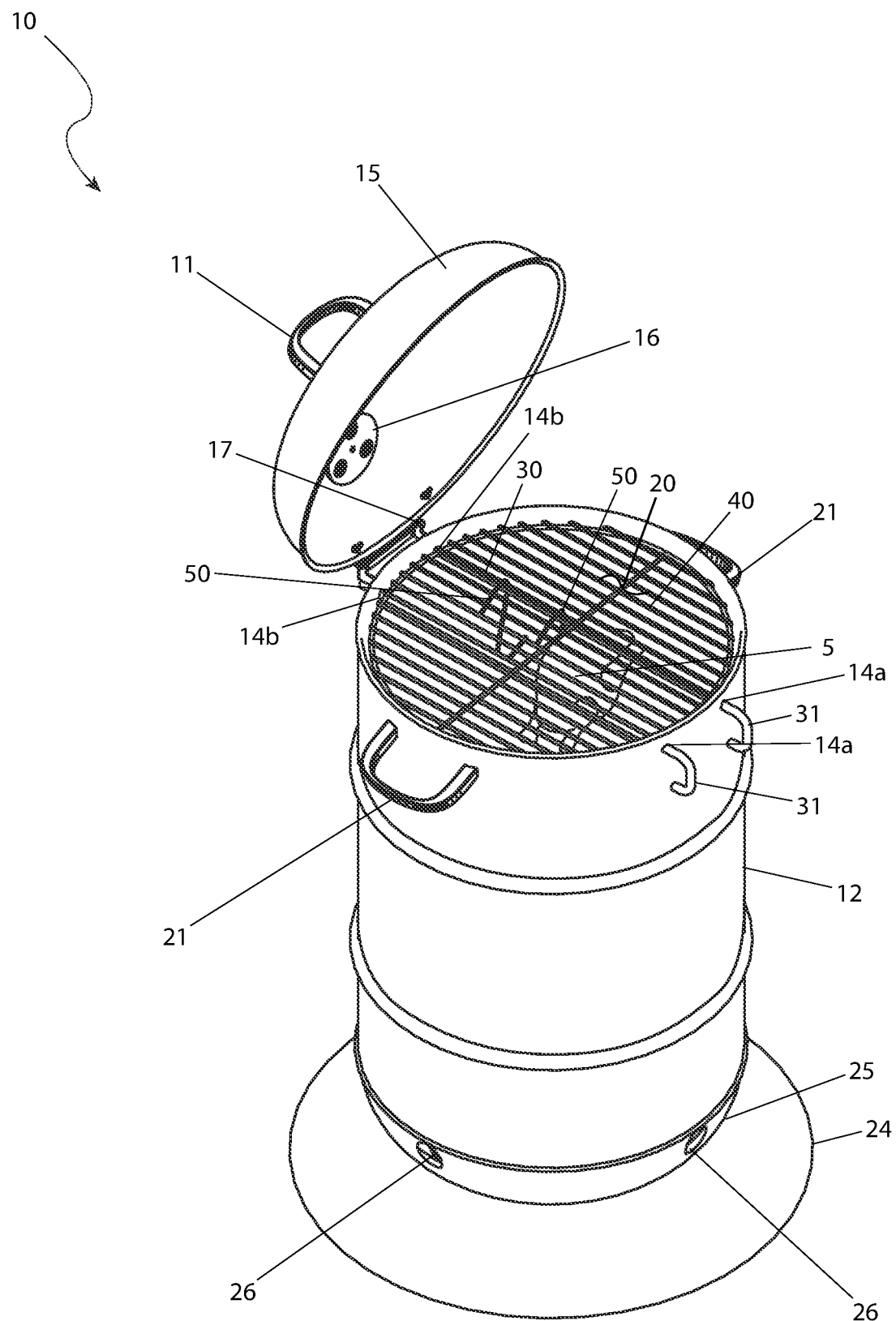
FIG. 2 is a top perspective view of the smoker 10 with the lid 15 in an open position, illustrating a grate 40 and food 5 being suspended on hangers 30, according to the preferred embodiment of the present invention.

Referring more closely to FIG. 2, each aligned pairs of apertures 14a, 14b are sized to permit the passage of a hanger 30. Each hanger 30 is a cylindrical rod having an outer diameter sized to be capable of passing through the aligned apertures 14a, 14b. A first side of each hanger 30 is shaped as a hook 31 to restrict full passage of the hanger 30 all the way through the aligned apertures 14a, 14b. At least one (1) grate 40 is capable of being supported within the smoker section 12 and capable of supporting food 5 thereon. Each hanger 13 is capable of supporting a food support 50, which enables hanging support of the food 5 from the hanger 30 so that the food 5 is suspended within the interior 20. Multiple food supports 50 can be suspended on each hanger 30 to provide a custom way to suspend the food 5 in the interior 20 of the smoking section 12. The amount is limited to the size of the smoker section 12, the amount of food 5 desired to be smoked, and the size and weight of the food 5 and food supports 50 suspended on each hanger 30. Each hanger 30 has a length such that the hook 31 and the distal end of the hanger 30 from the hook 31 both reside external from the interior 20 of the smoker section 12.

Figure 3:
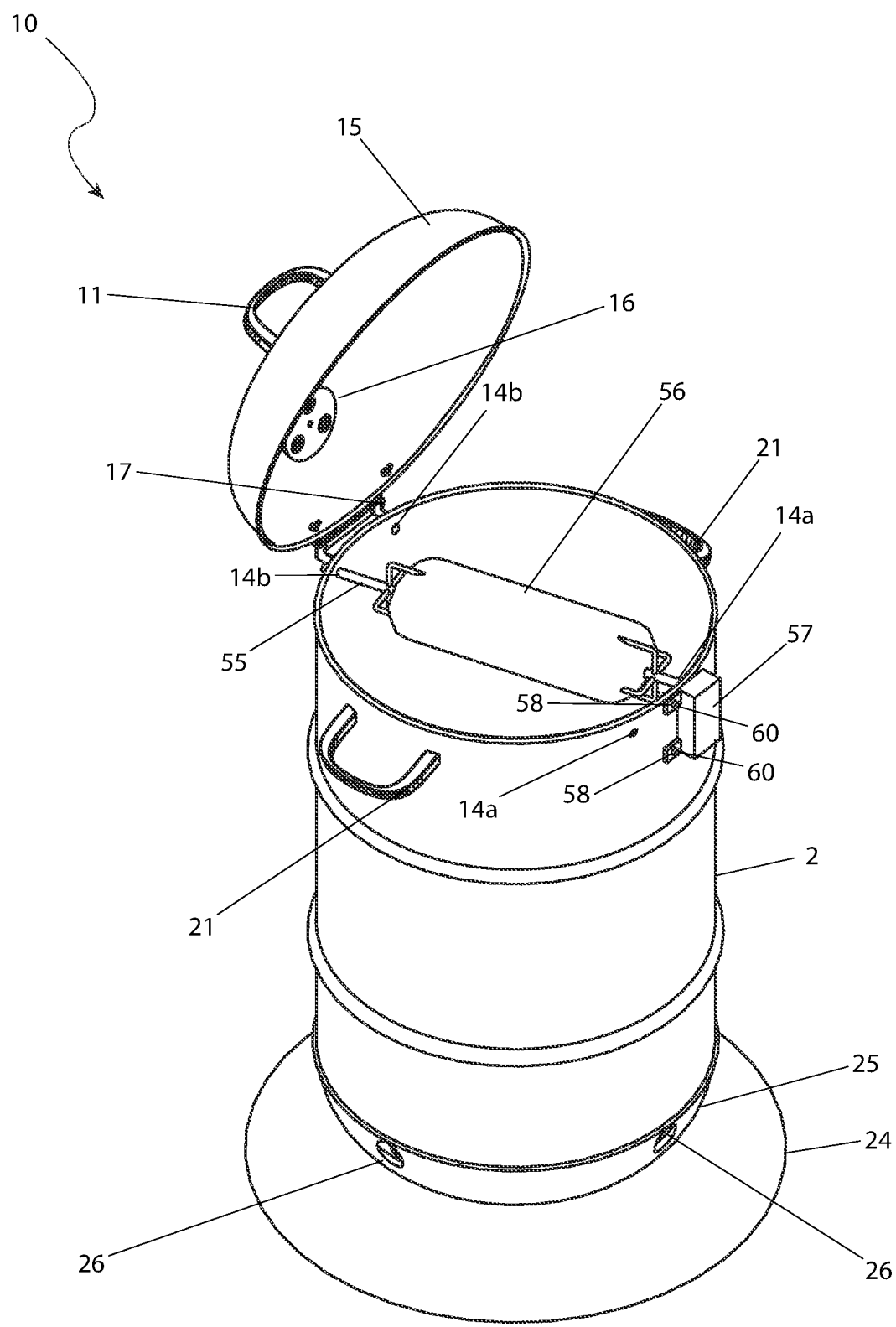
FIG. 3 is a top perspective view of the smoker 10 with the lid 15 in an open position, illustrating food 5 being suspended on a rotisserie rod 55, according to the preferred embodiment of the present invention.
Figure 4:
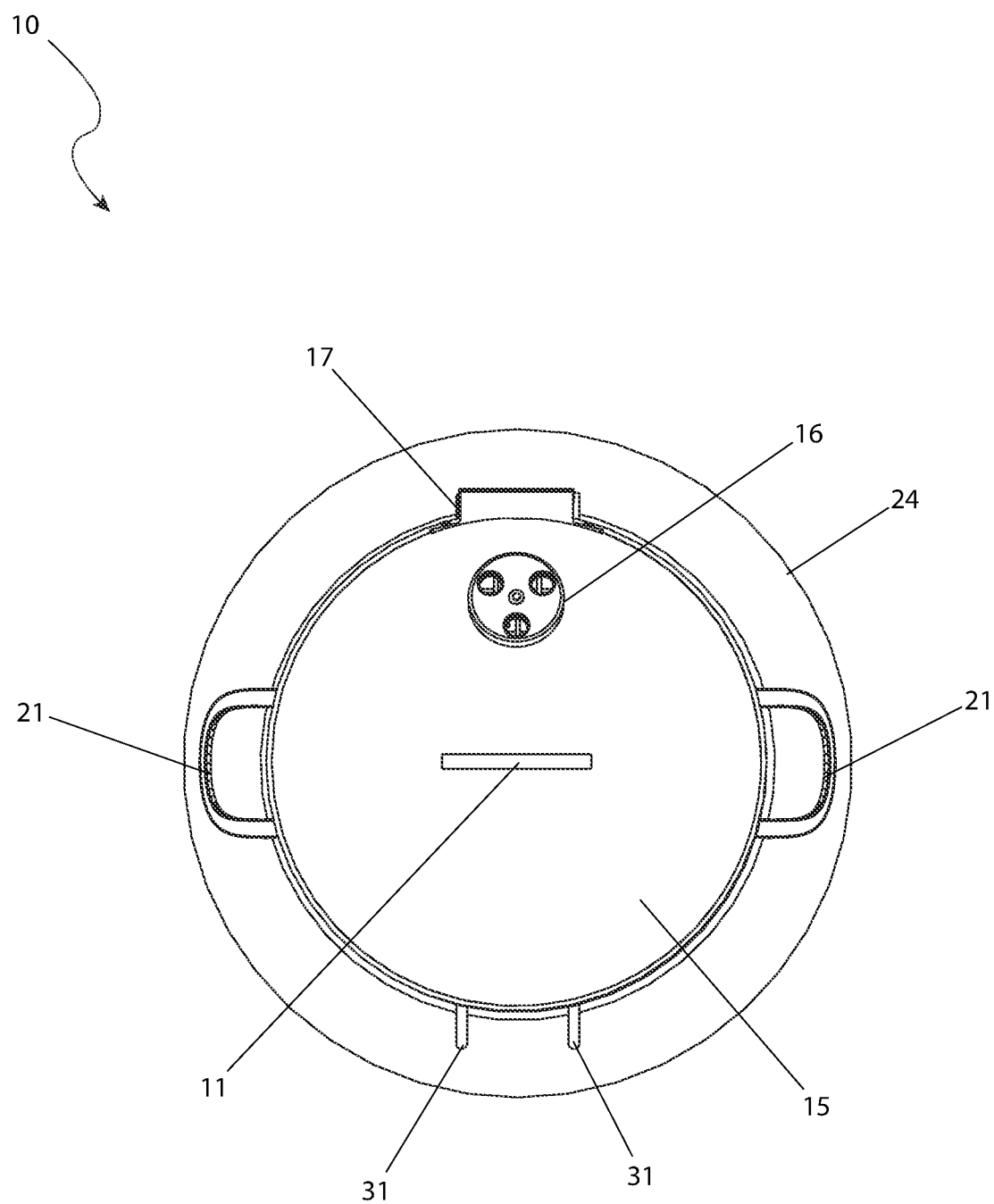
FIG. 4 is a top plan view of the smoker 10 with the lid 15 in a closed position, according to the preferred embodiment of the present invention; and, FIG. 5 is a side elevation view of the smoker 10 with the lid 15 in a closed position, according to the preferred embodiment of the present invention.
Figure 5:
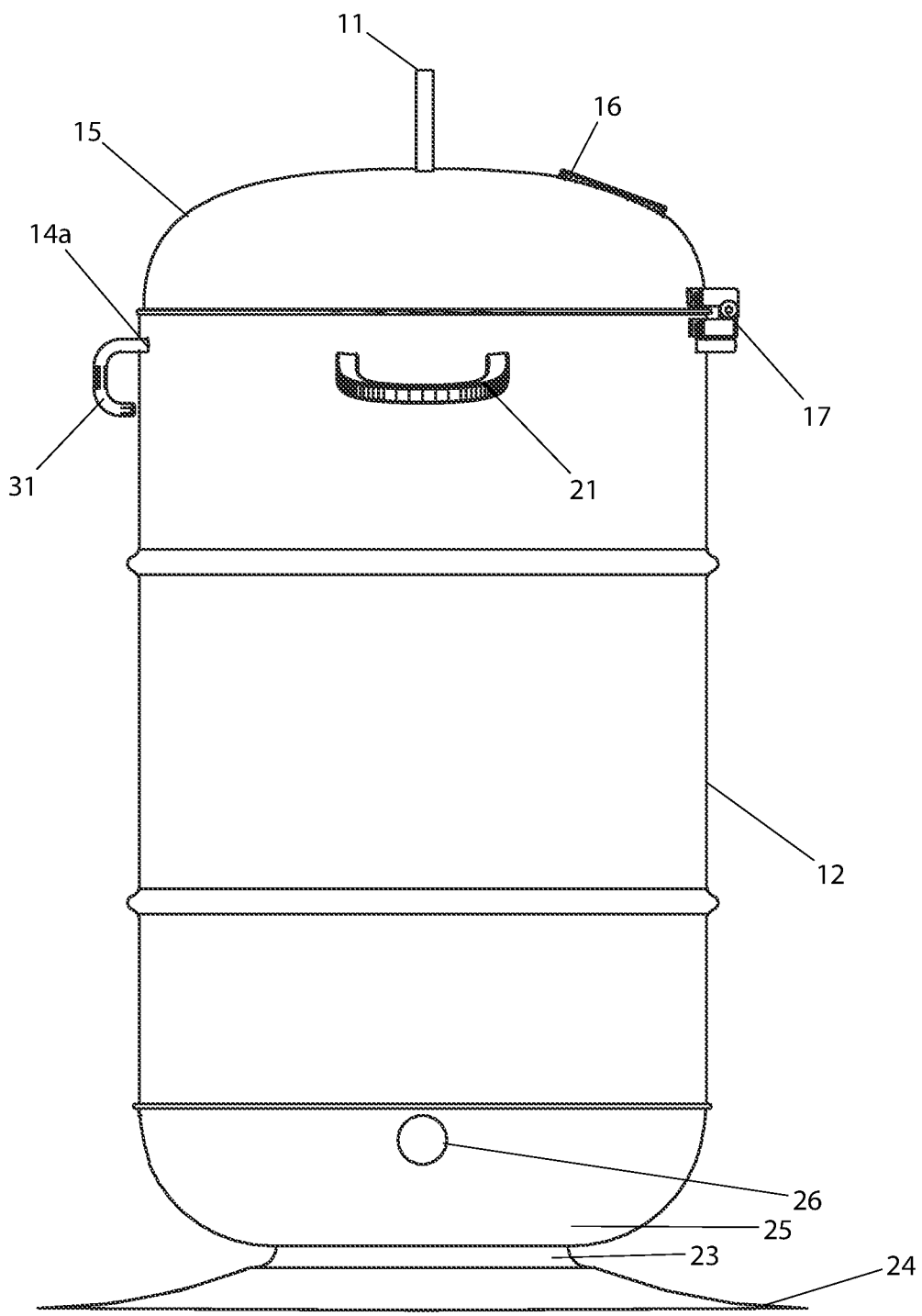

Referring more closely to FIG. 3, the apertures 14a, 14b are capable of supporting a rotisserie rod 55 therethrough. It is appreciated that the rotisserie rod 55 is threaded the opposite ones of the apertured 14a, 14b so that the centerpoint of the rotisserie rod 55 is aligned with the vertical axial bisecting centerline of the interior 20 of the smoker section 12. In the exemplary embodiment, the rotisserie rod 55 passes through the rightmost first side aperture 14a and the leftmost second side aperture 14b. A rotisserie motor 57 is capable of being secured to the exterior of the smoker section 12, adjacent to either the first side apertures 14a or second side apertures 14b, with fasteners 60 securing it to motor mount apertures 58. The rotisserie motor 57 is capable of being in electrical communication with a power supply. The rotisserie rod 55 is driven by the rotisserie motor 57 in a rotating motion. At least one (1) skewer fork 56 is capable of securing the food 5 to the rotisserie rod 55, so that the food 55 rotates with the rotisserie rod 55. A bushing (not shown) may reside on the rotisserie rod 55 opposite that of the rotisserie motor 57 to aid in a smooth rotation.

The firebox 25 is concave and is capable of holding an amount of fuel therein, such as wood, charcoal, or similar food-safe fuel for cooking. The firebox 25 may also have at least one (1) bottom vent 26 or a side door (not shown) in environmental communication with the interior 20 to permit the adding of fuel during the smoking event. The spacing between the outer surface of the bottom of the firebox 25 and the upper surface of the base 24 is such that minimal amount of heat is transferred from the burning fuel to the base 24. The base 24 is preferably of a larger diameter than the overall diameter of the smoker section 12 to ensure that any dripping of food 5 or embers do not contact the support surface (e.g., ground, deck, etc.) that the smoker 10 is on. The firebox 25 may have an inner ridge that the bottom perimeter rim of the smoker section 12 rests on or any other additional means to removably engage therewith.

The lid 15 is convex and has a bottom first side that is attached via a hinge 17 to a top first side of the smoker section 12. Preferably, the location of the hinge 17 is superjacent to the location of the either one (1) of the first side apertures 14a or second side apertures 14b. The hinge 17 may be a torsion spring to bias the lid 15 closed over the open top end of the smoker section 12. Other embodiments may provide for no hinge 17 connection of the lid 15 to the smoker section 12. In such an instance, the lid 15 merely rests within or receives a portion of the upper perimeter of the smoker section 12. The lid 15 typically further has a lid handle 11 located at the apex thereof. Also, a lid vent 16 in environmental communication with the interior 20 (when the lid 15 is placed on the smoker section 12) is typically located on the lid 15 at a position away from the lid handle 11 so as to not vent heat or steam directly thereat for safety purposes. Also possibly present in additional embodiments, but not shown in the present illustrations, may be a temperature gauge or a grill tool support. The lid 15 is typically sized so the bottom perimeter thereof rests on the top perimeter rim or within a ledge in the smoker section 12. In some embodiments, the overall outer diameter of the firebox 25, smoker section 12, and lid 15 is continuous when all of these components 25, 12, 15 are placed on each other as illustrated in FIGS. 1-5.

Other embodiments may provide for a water pan that is capable of being supported within the smoker section 12, typically above the firebox 25.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A food smoker, comprising:
   a domed lid having a bottom first side that is attached via a hinge to a top first side of a smoker section;
   a domed firebox framing the smoker section, the smoker section is generally hollow with an open top side, an open bottom side, and an interior;
   a base attached to the bottom of the domed firebox, the base supports a plurality of fuel, and a plurality of food held within the food smoker;
   two pairs of aligned apertures each permitting passage of a hanger therethrough; and
   at least one grate supporting within the smoker section supporting the food thereon;
   wherein a first side of each of the hangers is shaped as a hook to restrict full passage of the hanger all the way through the aligned apertures and the aligned apertures support a rotisserie rod therethrough.

2. The food smoker according to claim 1, wherein the domed lid is convex.

3. The food smoker according to claim 1, wherein the hinge is a torsion spring to bias the domed lid closed over the open top end of the smoker section.

4. The food smoker according to claim 1, wherein the domed lid includes a lid handle located at the apex of the domed lid.

5. The food smoker according to claim 1, wherein the outer circumference of the smoker section includes a plurality of ribs to provide a handle point therefor.

6. The food smoker according to claim 5, wherein the outer circumference of the smoker section includes the ribs to enhance or limit heat transfer.

7. The food smoker according to claim 1, further comprising a pair of side handles located on diametrically opposing sides of the smoker section located subjacent to the open top.

8. The food smoker according to claim 1, wherein the domed firebox is concave and holds a fuel selected from the group consisting of wood, charcoal, or food-safe fuel for cooking.

9. The food smoker according to claim 1, wherein the firebox includes at least one bottom vent in environmental communication with the interior of the domed firebox to permit adding fuel during a smoking event.

10. The food smoker according to claim 1, wherein spacing between the outer surface of the bottom of the firebox and the upper surface of the base is such that a minimal amount of heat is transferred from the burning fuel to the base.

11. The food smoker according to claim 1, wherein the domed firebox includes an inner ridge that a bottom perimeter rim of the smoker section rests on to removably engage therewith.

12. The food smoker according to claim 1, further comprising a lid vent in environmental communication with the interior of the domed lid at a position away from the lid handle so as to not vent heat or steam directly over the lid handle.

13. The food smoker according to claim 1, wherein the bottom of the firebox includes an integral neck that flares outward to transition into the base to provide balanced support to the food smoker, the fuel, and the food.

14. The food smoker according to claim 1, wherein the base is planar at the bottom of the firebox.

15. The food smoker according to claim 1, wherein the firebox, a neck, and the base are an integral unit.

16. The food smoker according to claim 1, wherein the base has a larger diameter than the smoker section to ensure that any dripping food or embers do not contact the support surface that the smoker is on.

17. The food smoker according to claim 1, wherein the smoker section, the domed lid, the domed firebox, a neck, and the base are made of metal.

18. The food smoker according to claim 1, wherein each of the hangers is a cylindrical rod having an outer diameter sized to pass through the aligned apertures.

19. The food smoker according to claim 1, wherein each of the hangers support a food support which enables hanging support of the food from each of the hangers so that the food is suspended within the interior of the domed firebox.

20. The food smoker according to claim 1, further comprising a rotisserie motor secured outside of the smoker section.

* * * * *